United States Patent
Hald et al.

(10) Patent No.: US 8,893,243 B2
(45) Date of Patent: Nov. 18, 2014

(54) METHOD AND SYSTEM PROTECTING AGAINST IDENTITY THEFT OR REPLICATION ABUSE

(75) Inventors: David Hald, Greve (DK); Claus Rosendal, Allerød (DK); Jakob Østergaard, Vanløse (DK)

(73) Assignee: SMS Passcode A/S, Brondby (DK)

( * ) Notice: Subject to any disclaimer, the term of this patent is extended or adjusted under 35 U.S.C. 154(b) by 633 days.

(21) Appl. No.: 13/128,303

(22) PCT Filed: Nov. 10, 2009

(86) PCT No.: PCT/EP2009/064897
§ 371 (c)(1),
(2), (4) Date: Aug. 25, 2011

(87) PCT Pub. No.: WO2010/052332
PCT Pub. Date: May 14, 2010

(65) Prior Publication Data
US 2011/0302641 A1     Dec. 8, 2011

(30) Foreign Application Priority Data

Nov. 10, 2008   (DK) .................................. 2008 01547

(51) Int. Cl.
  G06F 7/04        (2006.01)
  G06F 21/43       (2013.01)
  G06F 21/35       (2013.01)

(52) U.S. Cl.
  CPC ................ *G06F 21/43* (2013.01); *G06F 21/35* (2013.01)
  USPC .......................................................... 726/7

(58) Field of Classification Search
  USPC ............................................................ 726/7
  See application file for complete search history.

(56) References Cited

U.S. PATENT DOCUMENTS

| | | | |
|---|---|---|---|
| 5,881,226 A * | 3/1999 | Veneklase | 726/16 |
| 2002/0026376 A1 | 2/2002 | Shioda | |
| 2003/0172272 A1 | 9/2003 | Ehlers | |
| 2007/0077916 A1 | 4/2007 | Saito | |
| 2007/0136573 A1 | 6/2007 | Steinberg | |

FOREIGN PATENT DOCUMENTS

| | | | |
|---|---|---|---|
| EP | 1107089 A1 | 6/2001 | |
| GB | 2377523 A | 1/2003 | |
| GB | 2379040 A | 2/2003 | |
| GB | 2397731 A | 7/2004 | |

(Continued)

*Primary Examiner* — Teshome Hailu
(74) *Attorney, Agent, or Firm* — Polsinelli PC; Teddy C. Scott, Jr.; Ron Galant

(57) ABSTRACT

A system detecting and protecting against identity theft by abusing a computer users ID and password or protecting a user against identity replication through parallel user session via a second authentication level using a second channel, a one-time-passcode and user contextual location information. When accessing networks, computer systems or programs, the said networks, computer systems or programs will validate user ID and password and collect contextual information about the user, the device, the used network etc. Once validated, a message is send by a second means that may be a cell phone SMS network or an instant message, said message containing a real-time session-specific one-time passcode. The session specific code and the collected information provides information enabling the user to detect a compromised identity through a mismatch between presented information and the information representing the user and the passcode protects against fraudulent access.

13 Claims, 1 Drawing Sheet

(56) References Cited

FOREIGN PATENT DOCUMENTS

| | | |
|---|---|---|
| JP | 2003281448 A | 10/2003 |
| JP | 2003323408 A | 11/2003 |
| JP | 2004192193 A | 7/2004 |
| JP | 2005078452 A | 3/2005 |
| JP | 2005209083 A | 8/2005 |
| JP | 2007026039 A | 2/2007 |
| JP | 2007328381 A | 12/2007 |

* cited by examiner

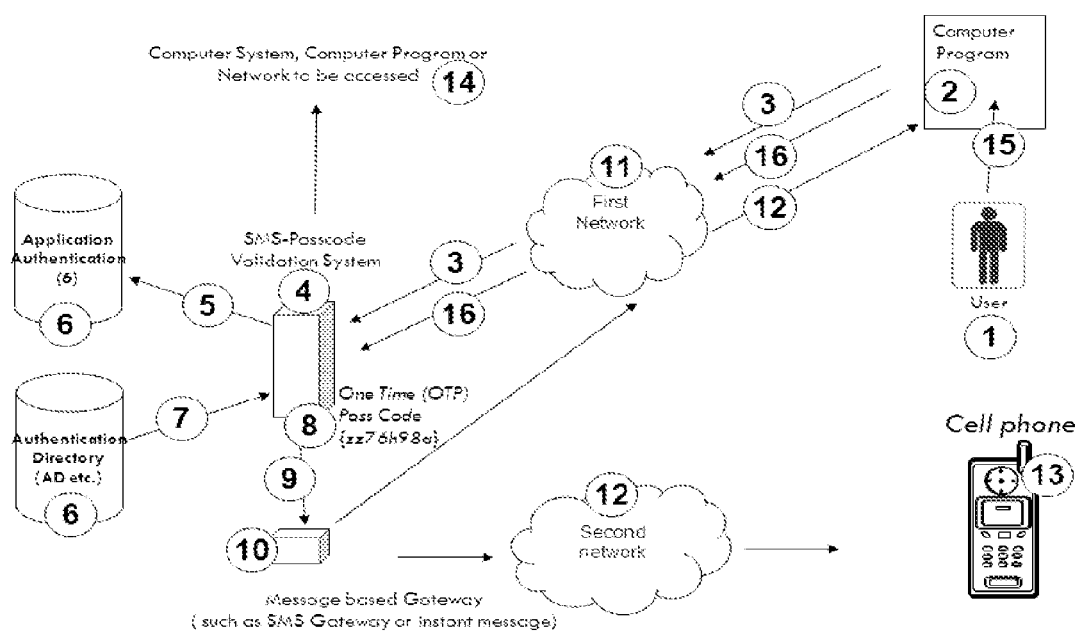

METHOD AND SYSTEM PROTECTING AGAINST IDENTITY THEFT OR REPLICATION ABUSE

CROSS-REFERENCE TO RELATED APPLICATIONS

This is a U.S. national stage entry of International Patent Application No. PCT/EP2009/064897, filed on Nov. 10, 2009, which claims priority to Danish Patent Application No. PA 2008 01547, filed on Nov. 10, 2008, the contents of all of which are hereby incorporated by reference.

TECHNICAL FIELD

The present invention relates to a method and system for computer-implemented access authorisation for authorising user-access to a target component of a computer system. In particular, the invention relates to such a method and system that prevents—or at least reduces the risk of—identity theft and/or identity theft through replication.

BACKGROUND

In the context of multi-user computers, authentication procedures are widely used to give a user access to the programs and system resources to which the user has been granted access. In the context of the present description, the term target component of a computer system is intended to refer to any entity of a computer system to which user-access may be granted based on an authentication scheme. Examples of such target components include a computer or group of computers, a computer network, a communications network, one or more computer programs executed on a data processing system, functionality of one or more computer programs, computer resources, such as drivers, memory, computer peripherals, data stored in a memory, services provided by a computer, etc. Traditional means of giving access make use of a user identification and a password. With the arrival of wide area networks and the internet, millions of computer programs and systems are now security-wise solely based on giving personalized access using a user identification and password. When communicating over a network, the method to keep track of the communication between the first and second computer device is done using a session identifier. In recent years, methods and programs to acquire a user's identity in the form of user identification and password have exploded in usage resulting in users being defrauded daily.

Sophisticated methods of stealing a user's identification and password involve so-called phishing, where a 3rd party gains access to a user's ID and password by criminal means. These methods may even involve more sophisticated attacks such as man-in-the-middle attacks, where a fraudulent 3rd party intercepts the communication between the user and a network, computer system or program when the user logs into said network, computer system or program. Once intercepted, the fraudulent 3rd party either establishes a parallel process and log into the same network, computer system or program as the user or simply acts as a middle-man and passes the user actions on to the said network, computer system or network for identity theft purposes.

One method for securing users against such attacks is to ensure that a second means of authentication is deployed. Such second means are also referred to as a second factor of authentication. The first generations of these solutions used a hardware device called a token that the user would carry with him/her everywhere. The method also seen as soft-tokens or sms-delivered token codes uses the method of a pre-issued passcode that is valid for a period of time or until used. These concepts have proven ineffective in preventing both phishing and in particular man-in-the-middle attacks as the user never knows, whether a fraudulent 3rd party has been present and intercepted the session.

A new generation of solutions is based on a message-based approach, most widely seen using the widely used Short Message System (SMS or Text Messaging) systems in cellular phone networks to send a passcode typically to a user's cell phone or, in an alternative implementation, the user will access a central server that then opens the system for the user's ID and password login process to be authorized. It is a problem of some current approaches that they use a separated login process where the SMS code is entered at the same time as the user ID and password, thus enabling phishing and similar methods for compromising credentials. The current implementations of these solutions also use pre-issued passcodes that are valid for a period of time or until used further, thus exposing them to man-in-the-middle attacks.

US 2007/0136573 discloses a system and method for authentication using at least one multiple multi-factor authentication. This prior art method relies on the presence and use of a trusted computer, and this prior art document does not disclose any method for establishing such a trusted computer such that the process for establishing the trusted computer is protected against man-in-the-middle attacks. It thus remains a problem to provide increased security against man-in-the middle attacks without the need for a trusted computer.

SUMMARY

To overcome some of the drawbacks of prior art solutions in stopping identity theft or identity replication like via phishing and pharming, embodiments of the method and system disclosed herein combine a real-time, session specific two-factor authentication method combined with personal knowledge of the user by including contextual information gathered during the login process in a message sent to the user.

When a user accesses a target component of a computer system from a first user system, the user is first asked to provide a user name and a password in the format of a password, pin or other secret. Embodiments of the method described herein validate the credentials and collect session specific contextual information and create a passcode that is only valid in association with the specific login session ID such as but not limited to a session cookie ID. The real-time passcode and the contextual information are sent via a communication network to a second user system. The contextual information enables the user to determine whether a man-in-the-middle attack is under way and if so, by not entering the session specific passcode the phishing and pharming attack is prevented. If the contextual information looks right, the user proceeds with the passcode and if validated against the session ID, the user is granted access.

In one embodiment, a method implemented by a computer-implemented system for authenticating a user attempting to access a target component of a computer system from a first user system is disclosed. Embodiments of the first user system are connectable to a first communications network, and embodiments of the method comprise:

receiving user authentication information entered by the user via a first user-interface of the first user system;
obtaining via the first communications network at least one item of contextual information chosen from information indicative of a property of the first user system or a property of the first communications network and a session identifier;

verifying the user authentication information, and responsive to successful verification of the user authentication information, sending a message from the computer-implemented authentication system via a second communications network to a second user system, the message comprising at least one item of contextual information or derived information from the collected contextual information such as an approximate location based on an IP address or a location name based on GPS (Global Positioning System) coordinates, allowing the second user system to present at least one item of contextual information and a session-specific one-time passcode to the user via a second user interface so as to allow the user to verify the at least one item of contextual information;

receiving via the first user system and the first communications network a session-specific passcode entered by the user into the first user system;

verifying the passcode; and responsive to a successful verification of the passcode, granting to the first user system access to the target component.

In some embodiments, the second and first user interfaces may be the same user interface. When the second user interface is different from the first user interface, e.g. different windows presented to the user (e.g. by the same or different software programs), different physical interfaces such as different displays, different message gateway such as an instant message system etc., the security of the system is further improved.

The first user system may be a computer such as a desktop computer, a portable or handheld computer or any other processing device connectable to a communications network, e.g. a personal digital assistant, communicator, telephone, network terminal, etc. The second user system may be any suitable device adapted to receive messages via a communications network.

The second user system, which will also be referred to as the second factor device, may be a communications device different from the first user system, e.g. a cellular phone, a pager, or other communications equipment carried by the user. Alternatively, the first and second user systems may be embodied as the same device adapted to implement two separate user interfaces, e.g. a first user interface in the form of a login program providing a user interface for entering user authentication information, and a second user-interface, e.g. a user interface of an instant messaging program or other program for receiving and displaying messages.

Accordingly, the first and second communications networks may be different networks, the same network, or they may partly use the same and partly different networks. Generally, the second communications network may be a network suitable for communicating real-time messages, e.g. a short text message system, an instant messaging system, or the like; therefore, the second communications network will also be referred to as message network. The first communications network may be any suitable type of communications network, e.g. a computer network such as local area network (LAN), a wireless local area network (WLAN), a wide area network (WAN), an internet, a telecommunications network such as a cellular communications network, e.g. based on a GSM, GPRS, EDGE, UTMS, HSDPA, WIMAX standard or any other suitable network.

The term "real-time session-specific one-time passcode" is intended to refer to a passcode that is generated in real-time during the login session with which it is associated, i.e. the session for which the passcode is session-specific. Hence, the passcode is not pre-generated or otherwise in existence before the corresponding login session is initiated. The passcode is session-specific, i.e. associated to one specific login session; preferably the passcode is unique for that session. Furthermore, the passcode is a one-time code, i.e. only valid for a single login.

Embodiments of the method and system described herein may be implemented by a computer system, computer program and message gateway for authenticating a user when said user accesses a computer system, computer program or network. Embodiments of the method and system described herein may use a session-specific message-based authentication process using at least two different factors/means of authentication: A first factor is known to the user, e.g. in the form of a user identification and a password, and a second factor is held by or accessible to the user e.g. in the form of a networked message-receiving device such as a conventional cell phone, pager, etc., or a computer program executed on a computer such as an instant messaging program.

Embodiments of the method and system described herein send a passcode message to the networked message-receiving device, e.g. by means of a real-time message-based method, where the message contains the generated real-time session-specific one-time passcode and contextual information gathered during the login process from e.g. the first communications network and/or the computer or other device used as first user system. The contextual information may be any suitable information that allows a user to detect that a login attempt has happened from another entity than the user's own, as such an attempt may indicate that an identity theft or identity replication event is likely happening. Examples of suitable contextual information include a computer identifier of a computer used as a first user system for performing the login process, at least approximate regional information about a location of the first user system from which the login attempt originates, thus enabling the user to assess, whether the computer performing the login process is the user's own computer or likely to be a fraudulent 3rd party computer performing a so-called man-in-the-middle attack. For example, the contextual identification information gathered during the login process from e.g. the computer or device or network used during the login may include an approximate regional location, e.g. based on an internet protocol address or global positioning coordinates from a cell phone or a unique data item determined from a combination the two, or the Internet browser's version, the operation system's language etc.

The first user interface may include a window-based or any other suitable interface of a login program executed on the first user system or on a server computer of the authentication system adapted to present the first user interface on the first user system. The second user-interface may also be a window-based or another suitable interface of a program executed on the second user system or on a server computer, or a display of a networked message receiving device. When a user logs into a system using an embodiment of the method or system disclosed herein, the user first enters his/her user credentials such as a user name and password into the first user-interface, e.g. a login window provided on the first user system. Once the credentials are validated, the authentication system may send a message containing the contextual information and a real-time session-specific one-time passcode to the second user system, e.g. to a second factor device assigned to the user. At the same time, the login window of the first user-interface changes to a new, second window where the real-time session-specific one-time passcode sent to the second factor device can be entered. Once this is entered and validated the login entity is granted access.

In an alternative embodiment, the login system, i.e. the first user system, may also display the contextual information gathered during the login process or other information that is only known to the owner of the ID and password credentials and not the entity attempting to fraudulently steal the identity. For example, the contextual information may be displayed in the second login screen used to enter the real-time session-specific one-time passcode sent over a separate message-based network, ensuring that the user can identify if it is a different computer that is actually logging into the system, which would be the case in a man-in-the-middle attack, where a third party person has intercepted the login process and is attempting to copy the said users personal information typically in the form of a login ID and password when the said user is prompted to enter the credentials.

In the event the second factor device is not connected to a message network, an embodiment of the method and system described herein may send a set of pre-issued passcodes to the user in advance. When the user subsequently accesses the login system with his/her credentials, the second login window would show the gathered contextual information and a request to the user to enter a combination of one or more pre-issued passcodes that, when entered in the proper combination creates a session specific code that, once validated, grants the user access.

The present invention relates to different aspects including the method described above and in the following, and corresponding systems, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

Exemplary embodiments of the present invention are described herein with reference to the drawings, in which:

FIG. 1 is a block diagram illustrating an exemplary embodiment of the invention.

DETAILED DESCRIPTION

FIG. 1 is a block diagram illustrating an embodiment of the method and system disclosed herein. In particular, FIG. 1 depicts an architecture diagram employing a computer-implemented user-authentication system (4) for providing an intended authorised user (1) access to a target component (14) of a computer system while preventing access by unauthorized users. The target component (14) may be a computer program, a computer or other data processing system, a computer network, or any other computer-accessible entity requiring authentication. The computer-implemented user-authentication system (6) may be a suitably programmed data processing system such as a server login screen program, a network access login program or similar, that comprises of suitable interfaces to a first private or public communications network (11), to one or more authentication systems (6) such as application login or network login systems such as a web site login system like Outlook Web Access or a windows login system such as the Windows Gina interface but with an added two-factor authentication system based on a real-time session-specific SMS One-Time-Passcode system (4) connected to a message based system such as a SMS message based gateway that is connected either via a computer serial interface or via a network to a hosted gateway and where the gateway is connected to a cell phone or similar network network and is able to send a message via said cell phone networks SMS service or a similar message network to a user device (10) or an instant message system based gateway that can transmit a message via a public or private network via a central or distributed set of computers to a separate program residing on the same or a different computer than the one used for login where the user has used a different method to login into the said instant message gateway user program and where the said instant message program will present the send information in a separate window from the one used to login with (2). The user-authentication system (4) provides the functionality of a traditional 2-factor authentication system based on SMS unlike a hardware token held by a user containing a code generator and a hardware display as seen by RSA or a soft token generator running on a cell phone showing the one-time passcode token in a cell phone display or a regular message based code that is pre-issued and valid for a period of time. Unlike the known alternatives, the real-time session-specific one-time passcode system (4) generates a unique one-time passcode for each specific login session only valid for that particular login session containing contextual information about that session. The first factor, usually a username and password, is validated by the authentication system (6). The authentication system (6) is described in more detail below. Besides generating the second factor of the 2-factor authentication system (4), the system also collects contextual information so that the intended authorised user can verify if he has been fraud from an unauthorized user, ex. from an attack commonly named man-in-the-middle. This is typically done via the network (11) connected to the system (2) that is attempting to logon. The contextual information is after the first factor has been validated presented to the user via either the same system (2) or via a second system via second network ex. system (13) via network (12). Alternatively the user-authentication system (4) can be integrated within an existing 2-factor authentication system to provide functionality regarding the collection of contextual information and the presentation to the intended authorised user (1).

The authentication system (6) is usually separated from the user-authentication system (4) and provides validation of the username and password. Ex. of authentication system (6) could be Microsoft Active Directory server, or a system holding information regarding username and password in an application like home banking.

Even though systems (4) and (6) are shown as separate systems, it alternatively will be possible that they may be implemented on the same computer and even by the same software application whereby the authentication system (6) and the real-time session-specific one-time passcode system is embedded in one and same application as seen in integrate universal access appliances in a format whereby the two programs works integrated where the message based authentication system (4) handles the entire login process but passes the User ID and password logic real time or cached to a backend authentication system (6) but offering a single user login experience managed by the message based authentication system (4).

The interfaces (5 and 7) between system (4) and system (6) will typically be traditional computer networks like Ethernet, Internet etc.

The first private or public communications network (11) may be any suitable type of communications network, e.g. a computer network such as local area network (LAN), a wireless local area network (WLAN), a wide area network (WAN), an internet, a telecommunications network such as a cellular communications network, e.g. based on a GSM, GPRS, EDGE, UTMS, HSDPA, WIMAX standard or any other suitable network.

The process is initiated by the user (1) requesting access (15) to the target computer via a user system (2), e.g. a computer such as a PC or any other data processing system connectable to the first communications network (11).

To this end, the user system (2) initially performs a login process, e.g. by executing a suitable login program on the user system (2) or by presenting a login window of a login program executed on the computer-implemented authentication system (4) or by the computer-implemented authentication system (6). Typically, the login process queries the user for a user name and password or other authentication information. The login process further collects additional contextual information about at least one of the user system (2) and the first communications network (11) from/via which access is requested, or information collected within the target component (14) or authentication system (6). The contextual information collected may be any information collectable by the login process that conveys user-verifiable information about a context of the login operation. For example, the contextual information may be information about a property of the user system and/or a property of the first communications network and/or the like. Suitable information about the user system may be information about one or more hardware properties, e.g. manufacturer of the user system, type of processor, amount of available memory, and/or one or more software properties, e.g. type and/or version of operating system. Other suitable information about a property of the user system includes information suitable for determining the geographic location of the user system, e.g. language settings of the operating system, language settings of the Internet browser, the type of Internet browser, the IP-address of the user system (2), the route of the network traffic, a GPs coordinate collected or similar or derived information from such collected information, eg such as a location calculated based on GPS coordinates or approximate location based on the IP address. Suitable information about the first communications network may be include the name of the network operator providing the network, network address, MAC-address, network route etc. When the information is collected automatically by the login process without a need for further user-input, the process is more efficient and the risk for misuse is further reduced, because the risk of an unauthorised user tampering with the collected data is reduced When the contextual information includes information that is easily and directly verifiable by the user, the contextual information can be used to verify the integrity of the login process. It will be appreciated that even though the contextual information may be suitable to uniquely identify the user system, this is not a requirement for the method described herein; for example, the contextual information may merely include information about the user system, such as the country, region, city or other information about the geographic location of the user system, or the manufacturer of the user system, and/or the like. Hence, based on such information, the user may still be able to judge whether the integrity of the login process is likely to have been compromised, e.g. by a man-in-the-middle attack.

When the user via user system (2) requests access to the target component (14) via the first public or private communications network (11), the request (3) is routed via the computer-implemented user-authentication system (4) to the authentication system (6) for a corporate user ID directory validation of the user's credentials, e.g. user name and password. The request (3) includes information required for the verifying the user's credentials, a session ID (e.g. a session cookie) identifying the login session, and the contextual information collected by the login process. The session ID may be generated by the authentication system to ensure that all incoming data packets with that session ID are associated to the correct login session. Once an authentication match is identified by system (6), computer-implemented user-authentication system (4) generates a unique message alert containing:
  The contextual information gathered during the login process from ex. the computer (2), device (2), target system (14) or network (3,11);
  A one-time passcode (OTP) (8), e.g. a password or another suitable form of code or another suitable real-time session specific one-time second means of authentication, generated in real-time by the authentication system. The one-time password is session specific, i.e. linked to and only valid for a specific session ID.

The computer-implemented user-authentication system (4) sends the generated message via a second communications channel (9,10,12) to a user-held communications device (13) or directly to the first computer system (2). In the example of FIG. 1, the computer-implemented user-authentication system (4) sends the generated message via a second network (9), e.g. a LAN-access or a secured WAN-access to an SMS gateway (10) that sends the message through a telecommunications network (12) to a cellular phone (13). The generated message may be sent via a serial interface, via an SMTP to SMS interface, a computer to instant message interface or any other suitable interface. The user receives the message in the cellular phone's message framework.

Upon receipt of the message, the user identifies and verifies the contextual information included in the message. If the user can verify the contextual information as being valid, the user enters at least the received real-time session-specific one-time pass code (15) into the user system (2).

When deploying a real-time session-specific one time passcode, the user system (2) sends a message (16) including the entered OTP (8) or other second means of authentication over the first private or public communications network (11) to the computer-implemented user-authentication system (4). The computer-implemented user-authentication system (4) matches the received OTP with the originally sent real-time session-specific one-time passcode and/or with the session ID, and if there is a match, the user system (2) is granted access to the target component (14) to which initial access was requested.

The user system (2) can also display the contextual information in a second window as an alternative means to send contextual information to the user via the first network and computer interface.

In summary, disclosed herein are embodiments of a method and system for detecting and protecting against identity theft by abusing a computer user's ID and password and/or protecting a user against identity replication through parallel user session via a second authentication level using a second channel, a one-time-passcode and user contextual location information. When accessing networks, computer systems or programs, the said networks, computer systems or programs will validate a user ID and password and collect contextual information about the user, the device, the used network etc. Once validated, a message is send by a second means that may be a cell phone SMS network or an instant message a real-time session specific one time passcode. The session specific code and the collected information provide information enabling the user to detect a compromised identity through a mismatch between presented information and the information representing the user and the passcode protects against fraudulent access.

The invention claimed is:

1. A method, implemented by a computer-implemented authentication system, for authenticating a user attempting to access a target component of a computer system from a first user system, the first user system being connectable to a first communications network, the method comprising:
   receiving, by at least one computing device, user authentication information entered by the user via a first user-interface of the first user system;
   obtaining, by the at least one computing device, via the first communications network a session identifier and at least one item of contextual information identifying the first user system or a property of the first communications network;
   verifying, by the at least one computing device, the user authentication information, and responsive to successful verification of the user authentication information, sending a message from the computer-implemented authentication system via a second communications network to a second user system, the message comprising
      (a) at least one item of said obtained contextual information or derived information of said obtained contextual information, allowing the second user system to present at least the at least one item of contextual information to the user via a second user interface so as to allow the user to verify the at least one item of contextual information, and
      (b) a real-time session-specific one-time passcode, different from the at least one item of said obtained contextual information, and associated with the session identifier;
   receiving, by the at least one computing device, via the first user system and the first communications network a passcode entered by the user into the first user system;
   verifying, by the at least one computing device, the entered passcode against the real-time session-specific one-time passcode and/or the session identifier; and responsive to a successful verification of the entered passcode, granting to the first user system access to the target component.

2. The method according to claim 1 wherein the target component is chosen from a computer, a computer program, computer program functionality, a computer resource, a computer network.

3. The method according to claim 1, wherein the first and second user systems are different devices.

4. The method according to claim 3, wherein the second user system is a portable communications device configured to receive and display the message.

5. The method according to claim 1 wherein the first and second user systems are embodied as a single user system adapted to provide the first and second user interfaces, and wherein the method comprises presenting at least the at least one item of contextual information by the single user system via a second user interface of the single user system different from the first user interface.

6. The method according to claim 1, wherein the first and second communications networks are different communications networks.

7. The method according to claim 1, further comprising communicating the passcode from the computer-implemented authentication system to the user.

8. The method according to claim 1, further comprising communicating gathered contextual information from the computer-implemented authentication system to the user via a second passcode window displayed by the first user system.

9. The method according to claim 1, wherein the authentication system creates a passcode in real-time that is only valid for the session ID created by the login attempt that invokes the code being created and sent.

10. The method according to claim 1, wherein the at least one item of contextual information comprises a computer identifier of a computer used as the first user system, or approximate regional information about a location of the first user system.

11. A non-transitory computer readable medium encoded with instructions for authenticating a user attempting to access a target component of a computer system from a first user system, the instructions executable by a processor, comprising:
   receiving user authentication information entered by the user via a first user-interface of the first user system;
   obtaining via the first communications network a session identifier and at least one item of contextual information identifying the first user system or a property of the first communications network;
   verifying the user authentication information and, responsive to successful verification of the user authentication information, sending a message from the computer-implemented authentication system via a second communications network to a second user system, the message comprising:
      a) at least one item of said obtained contextual information or derived information of said obtained contextual information, allowing the second user system to present at least the at least one item of contextual information to the user via a second user interface so as to allow the user to verify the at least one item of contextual information, and
      b) a real-time session-specific onetime passcode, different from the at least one item of said obtained contextual information, and associated with the session identifier;
   receiving via the first user system and the first communications network a passcode entered by the user into the first user system; and
   verifying the entered passcode against the real-time session-specific one-time passcode and/or the session identifier; and responsive to a successful verification of the entered passcode, granting to the first user system access to the target component.

12. A system for authenticating a user attempting to access a target component of a computer system from a first user system, the first user system being connectable to a first communications network, the system comprising:
   a first user system to receive user authentication information entered by the user via a first user-interface of the first user system;
   a communications network to obtain a session identifier and at least one item of contextual information identifying the first user system or a property of the first communications network; and
   an authentication system comprising at least one microprocessor, the at least one microprocessor to:
      verify the user authentication information and, responsive to successful verification of the user authentication information, sending a message from the computer-implemented authentication system via a second communications network to a second user system, the message comprising:

a) at least one item of said obtained contextual information or derived information of said obtained contextual information, allowing the second user system to present at least the at least one item of contextual information to the user via a second user interface so as to allow the user to verify the at least one item of contextual information, and b) a real-time session-specific onetime passcode, different from the at least one item of said obtained contextual information, and associated with the session identifier;

receive via the first user system and the first communications network a passcode entered by the user into the first user system; and verify the entered passcode against the real-time session-specific one-time passcode and/or the session identifier; and responsive to a successful verification of the entered passcode, grant to the first user system access to the target component.

13. The system according to claim 12 further comprising an authentication server, and wherein the at least one microprocessor further to provide the first user-interface on the first user system.

\* \* \* \* \*